United States Patent
Sugahara

Patent Number: 5,734,845
Date of Patent: Mar. 31, 1998

[54] BUS ARBITER PROVIDED IN A MULTI-PROCESSOR SYSTEM

[75] Inventor: Hirohide Sugahara, Kawasaki, Japan

[73] Assignee: Fujitsu Limited, Kawasaki, Japan

[21] Appl. No.: 214,590

[22] Filed: Mar. 18, 1994

[30] Foreign Application Priority Data

May 28, 1993 [JP] Japan ................... 5-126627

[51] Int. Cl.$^6$ .................................................. G06F 13/00
[52] U.S. Cl. ............................................................ 395/293
[58] Field of Search ........................... 395/725, 325, 395/835, 282, 293; 379/67; 370/85

[56] References Cited

U.S. PATENT DOCUMENTS

| | | | |
|---|---|---|---|
| 4,151,374 | 4/1979 | Fukahara et al. | 179/18 |
| 4,586,128 | 4/1986 | DeWoskin | 369/200 |
| 4,648,029 | 3/1987 | Cooper et al. | 395/325 |
| 4,680,753 | 7/1987 | Fulton et al. | 370/85 |
| 4,817,127 | 3/1989 | Chamberlin et al. | 379/67 |
| 4,991,203 | 2/1991 | Kakizawa | 379/209 |
| 5,287,531 | 2/1994 | Rogers, Jr. et al. | 395/250 |
| 5,548,782 | 8/1996 | Michael et al. | 395/835 |

Primary Examiner—Jack B. Harvey
Assistant Examiner—David A. Wiley
Attorney, Agent, or Firm—Staas & Halsey

[57] ABSTRACT

In a multi-processor system in which a plurality of units such as a CPU serving as an information processing unit and an I/O control unit can be connected over a system bus, when the plurality of units issue use requests for the system bus, a bus arbiter grants a use authority for the system bus to a specific unit in consideration with priority orders. The bus arbiter is connected to the respective units over at least one specific signal line. The specific signal line conforms to a specific transmission rule in a normal control mode, whereby a specific signal is transmitted over the specific signal line. When a unit is not connected, at least one specific signal line in the bus arbiter is fixed to a state unfeasible in a normal control mode. The specific signal line is monitored if necessary. When the specific signal line linked with a unit is controlled under a specific transmission rule, the unit is recognized as connected. When the specific signal line is fixed to a state unfeasible in a normal control mode, the unit is recognized as unconnected. This obviates the necessity of increasing the number of buses, allows the bus arbiter to distinguish units connected over the system bus from unconnected ones, and realizes a small-sized system.

16 Claims, 10 Drawing Sheets

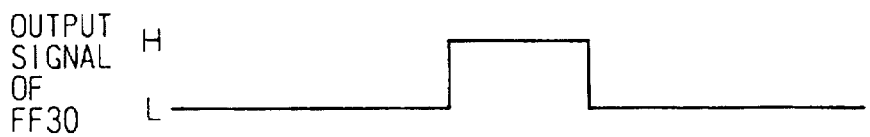
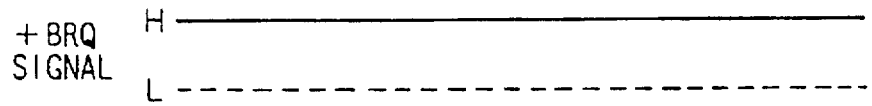
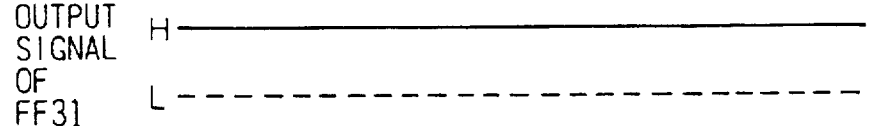
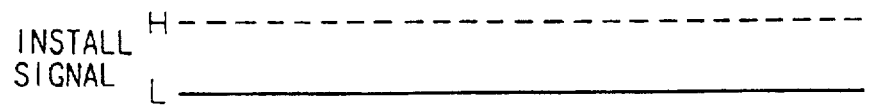

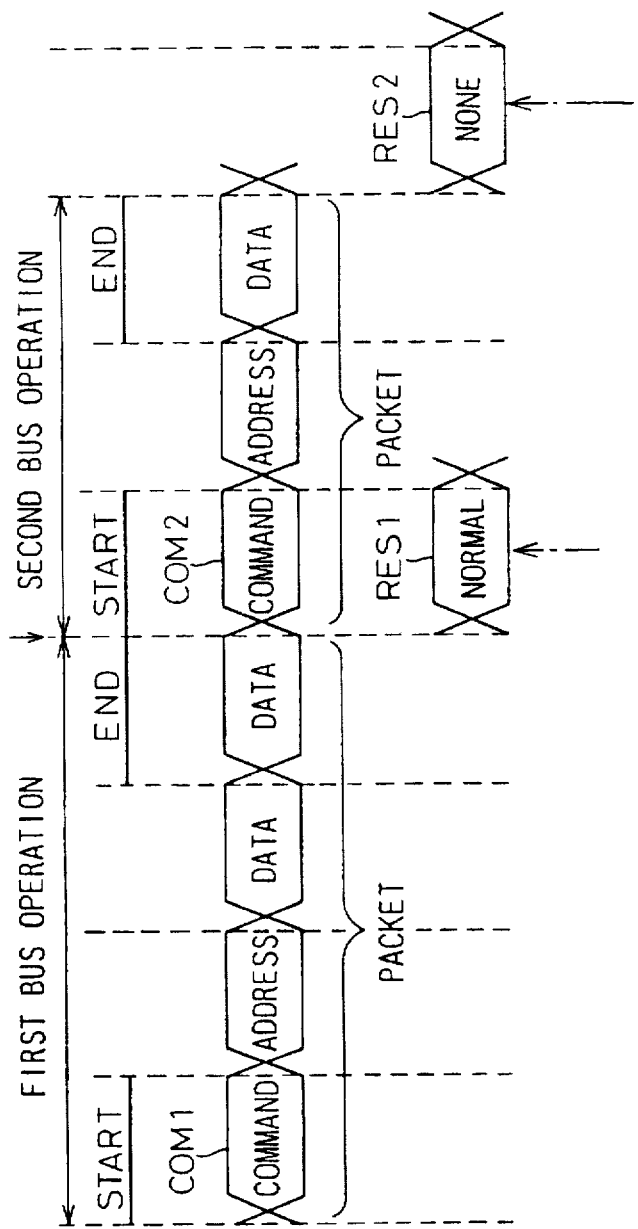

BUS ARBITER PROVIDED IN A MULTI-PROCESSOR SYSTEM

BACKGROUND OF THE INVENTION

1. Field of the Invention

The present invention relates to a bus arbiter for a multi-processor system. More particularly, this invention is concerned with a bus arbiter for a multi-processor system in which a given number of units can be connected over a system bus, wherein the bus arbiter distinguishes units connected via the system bus from disconnected ones, and helps realize a small-sized system.

2. Description of the Related Art

In the past, a multi-processor system has had a plurality of units, including a CPU serving as an information processing unit and an I/O control unit, connected over a single system bus. In this multi-processor system, when a plurality of units issue use requests for the system bus, a bus arbiter grants a use authority for the system bus to a specific unit in consideration of priority orders.

FIG. 1 shows a configuration of a conventional multi-processor system having a bus arbiter. In FIG. 1, 60 denotes a system bus, 61A to 61X denote the first to the X-th units including a CPU serving as an information processing unit and an I/O control unit, and 62 denotes a bus arbiter for controlling priority and contention occurring in use of the system bus 60.

For example, in a bus control mode that is referred to as a sprit mode, some of the units 61A to 61X attempting to perform data transfer issue bus requests to the bus arbiter 62 individually. In general, signal lines 63A to 63X conforming to specific transmission rules are laid to link the bus arbiter 62 with the units 61A to 61X on a one-to-one basis. The bus requests are sent from the individual units 61A to 61x to the bus arbiter over the signal lines 63A to 63X conforming to specific transmission rule. In response to the bus requests, the bus arbiter 62 grants a use authority for the bus 60 to a specific unit, for example, the unit 61S (not shown). The unit 61S acts as a bus master (parent station), and transfers data to or from a partner unit, for example, the unit 61T (not shown) acting as a bus slave (child station). When the bus master unit 61S completes data transfer to the bus slave 61T, the system bus 60 is released. The bus arbiter 62 then grants a bus use authority to any other unit which has issued a bus request.

In the foregoing system, an arbitrary number of units are connected over a system bus and located at arbitrary positions. Depending on a situation, the number of units to be connected over the system bus 60 is increased or decreased. In this case, the bus slave 61T to which the bus master 61S attempts to transfer data may not be connected over the system bus. If the bus arbiter 62 can recognize the connecting states of units, it would be advantageous in various aspects.

When a system bus is used for such a technology that a bus master places a transmission bus signal on the system bus 60 so as to perform a bus operation and a bus slave places a response bus signal on the system bus 60 so as to report its own receiving state, if a unit acting as the bus slave is not present, the response bus signal is not sent over the system bus 60. Normally, even if the multi-processor system enters a non-drive state (no signal is sent), the system bus 60 is fixed in a specific logical state (for example, a logical 0 or 1 state) due to a resistor. Based on the logical state, the bus master can recognize the presence or absence of the bus slave unit.

However, a register is used to fix a system bus to a specific logical state (logical 0 or 1 state). Besides, the resistor is slow to determine a logical state. For a system bus over which a high-speed clock is transmitted uninterruptedly, it takes much time for a bus master to recognize the absence of a bus slave using the logical state. If the bus arbiter 62 can quickly recognize a state that a unit is not connected over a system bus, the system bus can be used instead of the unit acting as a bus slave to return a response bus signal, which indicates that the bus slave unit is not connected, to a bus master.

Dedicated signal lines 64A to 64X for use in reporting that units are mounted may be, as shown in FIG. 1, laid to link mounted units with the bus arbiter 62. This mode is feasible for some bus technologies. In this mode, the bus arbiter 62 can quickly recognize the connected or unconnected states of units over the dedicated signal lines 64A to 64X.

In the above mode, the dedicated signal lines 64A to 64X for use in indicating connected states are laid to link the bus arbiter 62 with the units 61A to 61X so that the bus arbiter 62 can recognize the connected states of the units 61A to 61X. The number of bus signal lines accommodated in the system bus is therefore very large, which leads to an increase in cost.

SUMMARY OF THE INVENTION

An object of the present invention is to solve the above problem and to provide a bus arbiter for a multi-processor system that obviates the necessity of laying down new dedicated signal lines for use in reporting the connected states of units to link a system bus with units but permits recognition of the connected or unconnected states of the units over the system bus.

According to the present invention, new dedicated signal lines are not laid to detect the connected or unconnected states of units on a system bus, but a specific signal line or specific signal lines that are conventionally used to link a bus arbiter with units on a one-to-one basis and conformable only to a specific transmission rule in a normal control mode are employed.

When a unit is not connected, a specific signal line or specific signal lines are fixed to a state, which is unfeasible in a normal control mode, by means of one or more pull-up resistors.

A connection detector incorporated in the bus arbiter monitors the specific signal line or specific signal lines. When the specific signal line or specific signal lines are controlled under a specific transmission rule, a unit concerned is recognized as connected. When the specific signal line or signal lines are fixed to a state unfeasible in a normal control mode, the unit is recognized as unconnected.

Normally, some kinds of specific signal lines (for example, signal lines for a bus operation request signal and a bus operation end signal) are laid to link a bus arbiter with units on a one-to-one basis. These signals usually operate according to specific patterns alone, though they depend on a bus control mode. In the present invention, at least one specific signal line is laid to link units with a bus arbiter. When a unit concerned is not connected, the specific signal line is fixed to a normally-unfeasible state by means of a pull-up resistor. A connection detector for detecting the aforesaid specific pattern is incorporated in the bus arbiter. When the connection detector detects the specific pattern in a specific signal line linked with a certain unit, the unit is recognized as connected.

Thus, a connected or unconnected state can be detected using an existing specific signal line, and new dedicated signal lines need not be laid to detect a connected or unconnected state. This results in a small system bus.

BRIEF DESCRIPTION OF THE DRAWINGS

The present invention will be more clearly understood from the description set forth below with reference to the accompanying drawings, wherein:

FIGS. 5A to 5D shows waveforms representing the operation of the connection detection circuit in FIG. 4 to be performed with a unit connected: FIG. 5A shows a waveform of a +BRQ signal; FIG. 5B shows a waveform of an output signal of the first flip-flop; FIG. 5C shows a waveform of an output signal of the second flip-flop; and FIG. 5D shows a waveform of an output signal of a NAND circuit;

FIGS. 6A to 6D show waveforms representing the operation of the connection detection circuit in FIG. 4 to be performed with the unit unconnected: FIG. 6A shows a waveform of a +BRQ signal; FIG. 6B shows a waveform of an output signal of the first flip-flop; FIG. 6C shows a waveform of an output signal of the second flip-flop; and FIG. 6D shows a waveform of an output signal of a NAND circuit;

FIG. 7A shows bus operations performed by a certain unit in the multi-processor system in FIG. 2, wherein transfer sequences concerning a tag bus, a data bus, and a response bus are illustrated for a bus operation performed on a connected unit (first bus operation) and for a bus operation performed on an unconnected unit (second bus operation);

FIG. 7B is an explanatory diagram showing the contents of a command;

DESCRIPTION OF THE PREFERRED EMBODIMENTS

Figure 1:
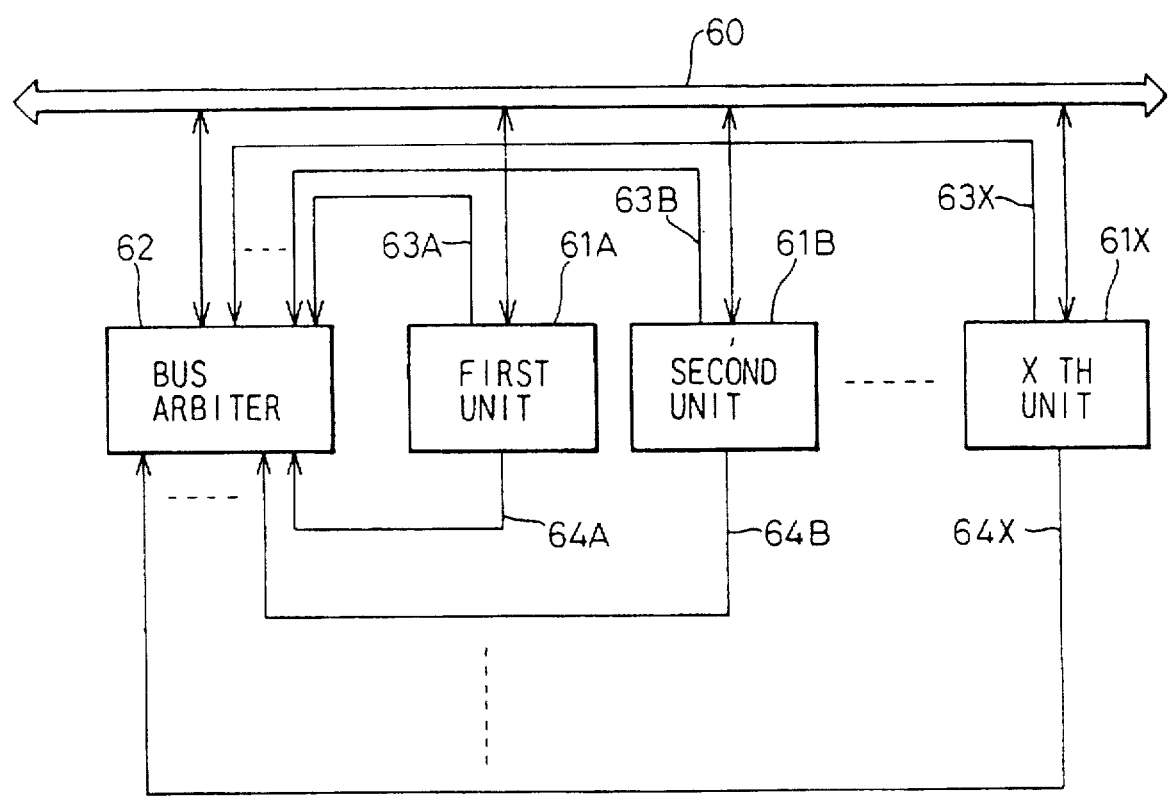
FIG. 1 is a block diagram showing a configuration of a conventional multi-processor system.
Figure 2:
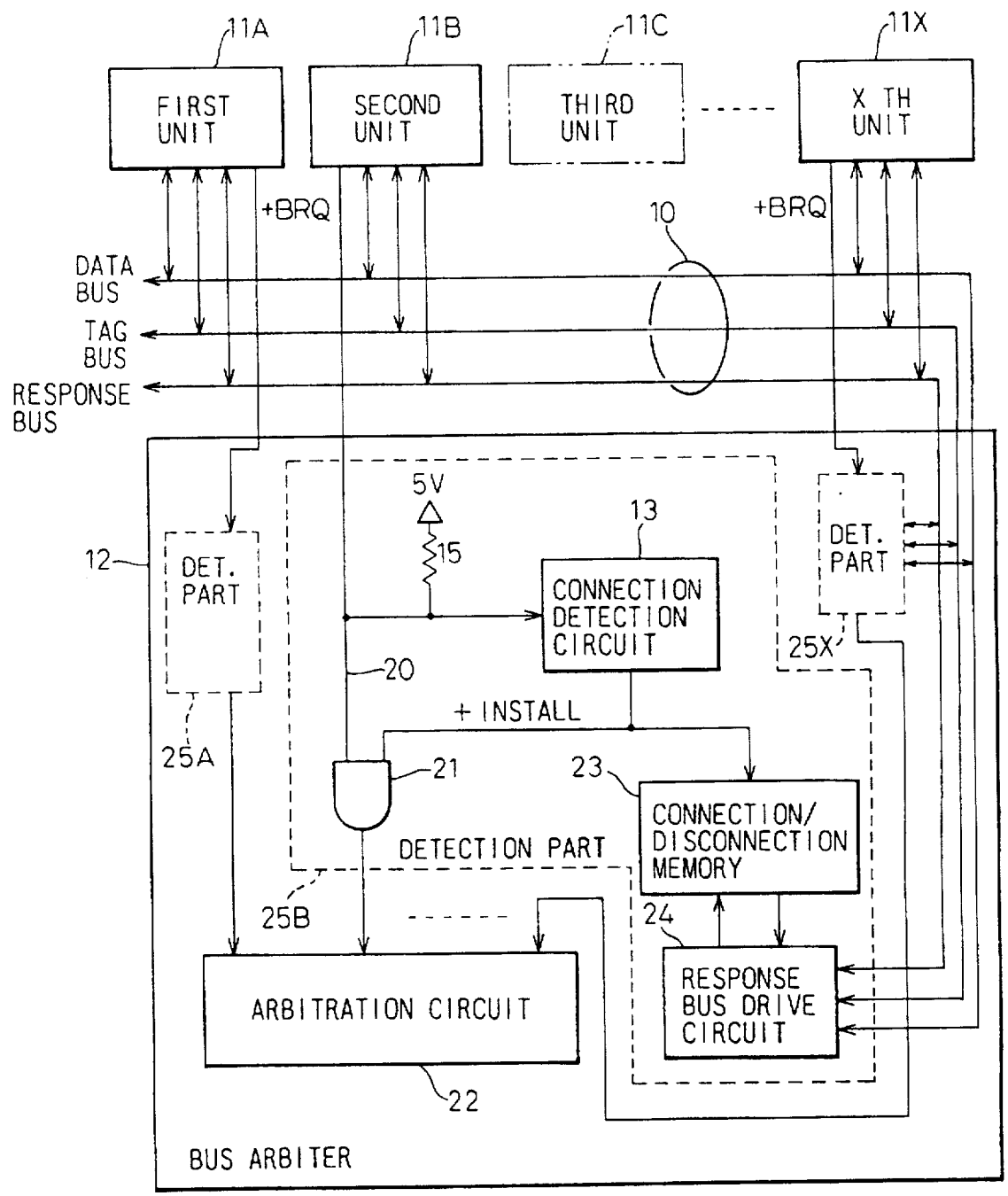
FIG. 2 is a block diagram showing a configuration of a bus arbiter of an embodiment of the present invention for a multi-processor system.

FIG. 2 is a block diagram showing a configuration of a bus arbiter of an embodiment of the present invention for a multi-processor system. In FIG. 2, 10 denotes a system bus including a data bus, a tag bus, and a response bus, 11A to 11X denote the first to X-th units such as a CPU serving as an information processing unit and an I/O control unit, 12 denotes a bus arbiter for controlling priority and contention occurring in use of the system bus 10, and 20 denotes a specific signal line for use in linking the units 11A to 11X with the bus arbiter 12 on a one-to-one basis. The specific signal line 20 is conformable to a specific transmission rule, thus allowing a specific signal to flow thereon. In this embodiment, only one specific signal line is laid to link the units 11A to 11X with the bus arbiter 12. The bus arbiter 12 includes an arbitration circuit 22. The units 11A to 11X are connected to the arbitration circuit 22 via detectors 25A to 25X in the bus arbiter 12. The circuitries of the detectors 25A to 25X will be apparent from the description below concerning the detector 25B.

A connection detection circuit 13 for detecting a connected or unconnected states of the units 11A to 11X, a pull-up resistor 15, an AND circuit 21, a connected/unconnected-state memory 23, and a response bus drive circuit 24 are incorporated in the detector 25B. The specific signal line 20 is branched into the connection detection circuit 13. The branched specific line 20 is linked with a +5 V power supply via the pull-up resistor 15.

An output line of the connection detection circuit 13 is sent to the AND circuit 21 and the connected/unconnected-state memory 23. An output of the AND circuit 21 is fed to the arbitration circuit 22.

The connected/unconnected-state memory 23 and the response bus drive circuit are mutually connected. The response bus drive circuit 24 is connected over the system bus 10.

The operation of the bus arbiter 12 having the foregoing configuration shown in FIG. 2 and being accommodated in a multi-processor system will be described below. For data transfer over the system bus 10 in this embodiment, each of the units 11A to 11X issues a bus request to the bus arbiter 12. When a bus request is produced, a +BRQ signal is asserted; that is, sent over the request signal line 20 for a time interval of 1 corresponding to one cycle of a clock. When a unit is not connected, the +BRQ signal is always asserted or sent over the request signal line 20 by means of the pull-up resistor 15.

Figure 3A:
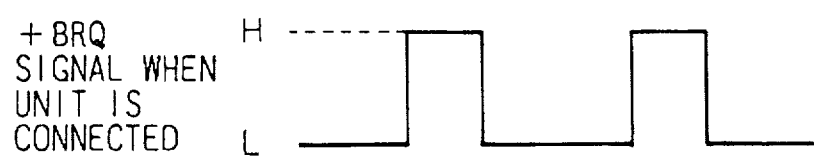
FIG. 3A shows a waveform of a +BRQ signal that is sent over a bus request line or a specific signal line with a unit connected.
Figure 3B:
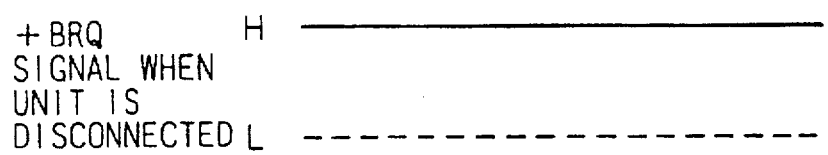
FIG. 3B shows a waveform of the +BRQ signal that is sent over the bus request line or a specific signal line with the unit unconnected.

FIG. 3A shows a waveform of the +BRQ (bus request) signal that is sent over the specific signal line 20 (for example, bus request line) with a unit connected. FIG. 3B shows a waveform of the +BRQ signal that is sent over the specific signal line 20 with the unit unconnected. When the unit is connected, the +BRQ signal on the specific signal line 20 is low normally. The +BRQ signal is driven under a specific transmission rule. When the unit is not connected, the +BRQ signal on the specific signal line 20 is driven high by the pull-up resistor 15 shown in FIG. 2.

As shown in FIG. 2, the connection detection circuit 13 incorporated in the bus arbiter 12 monitors the request signal line 20 to see if a certain unit or the unit 11B is connected. When the +BRQ signal is sent for a time interval of 2t or longer, a connection indicator signal +Install sent from the unit 11B is negated; that is, not output. A message saying that the unit 11B is not connected is placed in, for example, the connected/unconnected-state memory 23 in the bus arbiter 12. When a command requesting for processing is issued from another unit to an unconnected unit, the response bus drive circuit 24 references the connected/unconnected-state memory 23, and substitutes for the unconnected bus slave unit to report a message, which says that the bus slave unit is disconnected, to a bus master using the response bus.

In this embodiment, the connection detection circuit 13 detects an unconnected state of a unit. When the connection indicator signal +Install is negated, the AND circuit 21 serving as an inhibition circuit inhibits the bus request signal +BRQ from representing a bus request or an original object of the +BRQ signal to the arbitration circuit 22. The arbitration circuit 22 arbitrates between use requests for a bus so as to control contention or priority for the bus. The circuit elements of the arbitration circuit 22 are identical to those of a conventional one and a detailed description will therefore be omitted.

Figure 4:
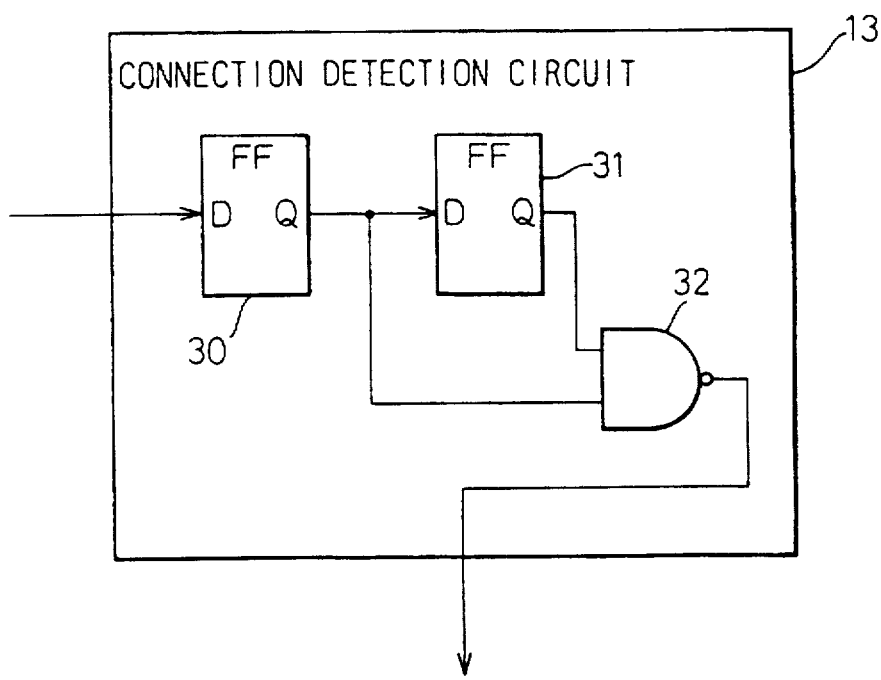
FIG. 4 is a block circuit diagram showing an example of circuit elements of a connection detection circuit in FIG. 2.

FIG. 4 is a block circuit diagram showing an example of circuit elements of the connection detection circuit 13 in FIG. 2. The connection detection circuit 13 consists, for example, of a first flip-flop 30, a second flip-flop 31, and an NAND circuit 32. The bus request signal +BRQ is fed to an input terminal D of the first flip-flop 30, and supplied to the second flip-flop 31 and NAND circuit 32 through an unreversed output terminal Q of the first flip-flop 30. An uninverted output Q of the second flip-flop 31 is fed to the NAND circuit 32. An output of the NAND circuit 32 is sent as an Install signal from the connection detection circuit 13.

The bus request signal +BRQ will not, as described previously, be sent continuously for a time interval of 2t or longer in a normal control mode. For each clock, the state of the first flip-flop 30 is transferred to the second flip-flop 31 and the state of the bus request signal is fetched into the first flip-flop 30. If the outputs of the first and second flip-flops 30 and 31 are high (logical one), the NAND circuit 32 negates the connection indicator signal +Install. If both or either of the outputs of the first and second flip-flops 30 and 31 is low (logical zero), the connection indicator signal +Install is asserted.

FIGS. 5A to 5D shows waveforms representing the operation of the connection detection circuit in FIG. 4 to be performed with a unit connected. In response to a bus request signal +BRQ shown in FIG. 5A, the first flip-flop 30 outputs a signal shown in FIG. 5B. In response to the output signal of the first flip-flop 30, the second flip-flop 31 outputs a signal shown in FIG. 5C. The NAND circuit 32 for inputting the output signals of the first and second flip-flops 30 and 31 provides a high-level output signal +Install shown in FIG. 5D.

FIGS. 6A to 6D show waveforms representing the operation of the connection detection circuit in FIG. 4 to be performed with a unit unconnected. In this case, as shown in FIG. 6A, the bus request signal +BRQ to be fed to the first flip-flop 30 is always driven high by means of the pull-up resistor 15. The first flip-flop 30 therefore outputs a high-level signal shown in FIG. 6B all the time. In response to the output signal of the first flip-flop 30, the second flip-flop 31 outputs a high-level signal shown in FIG. 6C all the time. The NAND circuit 32 for inputting the output signals of the first and second flip-flops 30 and 31 provides a low-level output signal having the waveform shown in FIG. 6D.

The bus operation concerning the system bus 10 in this embodiment will be described using the transfer sequences shown in FIG. 7A. During the first bus operation, data transfer is performed on the assumption that the unit 11B in FIG. 2 acts as a bus master and the unit 11A acts as a bus slave. During the second bus operation, data transfer is performed on the assumption that the unit 11A acts as a bus master and the unconnected unit 11C acts as a bus slave.

First, during the first bus operation, the bus master 11B receives a bus use authority from the bus arbiter 12. The bus master 11B then transmits a packet, which has a command COM1 as the first word, and an address and data as the second word and thereafter, over a data bus. A tag bus is used to indicate a use start and a use end for the data bus. A command consists, as shown in FIG. 7B, of a name of a unit acting as a bus slave, a command type, a data length, and other data. Normally, a unit designated as a bus slave with a command reports its own receiving state using a response bus at the end of the last word of the packet.

For example, when receiving the command COM1 from the bus master 11B, the bus slave 11A reports its own receiving state using the response bus. In this case, if the receiving state is normal, the bus slave 11A sends a response signal RES1, which says that the receiving state is normal, over the response bus.

Next, during the second bus operation, first, the bus master 11A receives a bus use authority from the bus arbiter 12. The bus master 11A then transmits a packet, which has, as shown in FIG. 7A, a command COM2 as the first word and an address and data as the second word and thereafter, over the data bus. Normally, a unit designated as a bus slave with a command reports its own receiving state using the response bus at the end of the last word of the packet. In FIG. 7A, however, the unit 11C designated as a bus slave with a command is not connected.

At the end of the last word of the packet, the bus arbiter 12 sends a response signal RES2, which says that a bus slave unit is unavailable, over the response bus.

In this case, if the receiving state is normal, the bus slave 11A sends the response signal RES1, which says that the receiving state is normal, over the response bus.

As described in the embodiment shown in FIG. 2, the bus arbiter 12 recognizes the connected or unconnected states of bus slave units. When the bus slave 11C is not connected, the bus arbiter 12 substitutes for the bus slave unit, allows the response bus drive circuit 24 to drive a response signal on the response bus, and thus informs the bus master 11A of the fact that the bus slave 11C is not connected.

Figure 8:
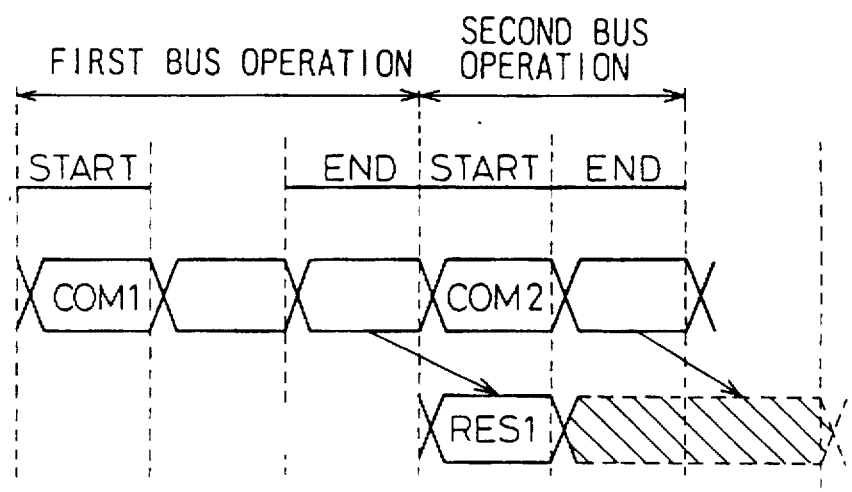
FIG. 8 shows transfer sequences for explaining a drawback occurring when a certain unit performs a bus operation on an unconnected unit in a conventional multi-processor system that does not include dedicated lines.

FIG. 8 shows a bus operation of the response bus when the bus arbiter 12 has no response bus drive circuit 24 therein. In this case, when the bus slave 11C is not connected, the bus arbiter cannot inform the bus master 11A of the fact that the bus slave 11C is not connected. When a bus slave unit to which the command COM2 is sent is not connected, the bus arbiter for a multi-processor system in FIG. 8 cannot return a response. The logical state of the response bus is not therefore determined and regarded as uncertain. This may cause the multi-processor system to operate incorrectly.

When the bus arbiter 12 does not provide a response signal, as shown in FIG. 8, the logical state of the response bus is not determined and may cause the multi-processor system to operate incorrectly. According to the present invention, since the bus arbiter 12 can detect the presence or absence of a bus slave unit, the incorrect operation can be avoided.

Figure 9:
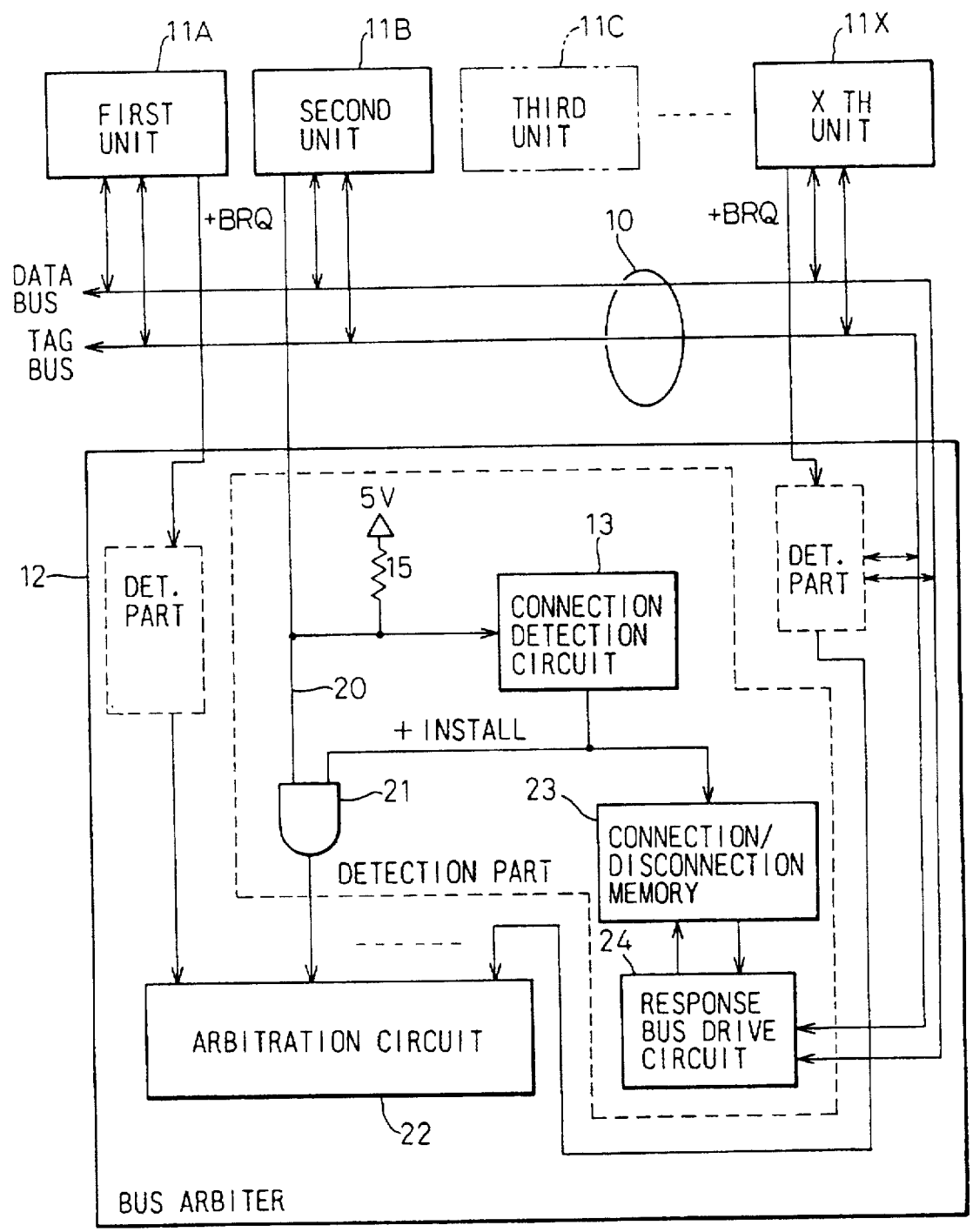
FIG. 9 is a block diagram showing a configuration of a bus arbiter of another embodiment of the present invention for a multi-processor system that does not include a response bus.

FIG. 9 is a block diagram showing a configuration of a bus arbiter 12 of another embodiment of the present invention for a multi-processor system in which the system bus 10 does not include a response bus. The components of the bus arbiter 12 are identical to those of the bus arbiter described in conjunction with FIG. 2, and the description of the components will therefore be omitted. The transfer sequence concerning the data bus alone will be described below.

Figure 10:
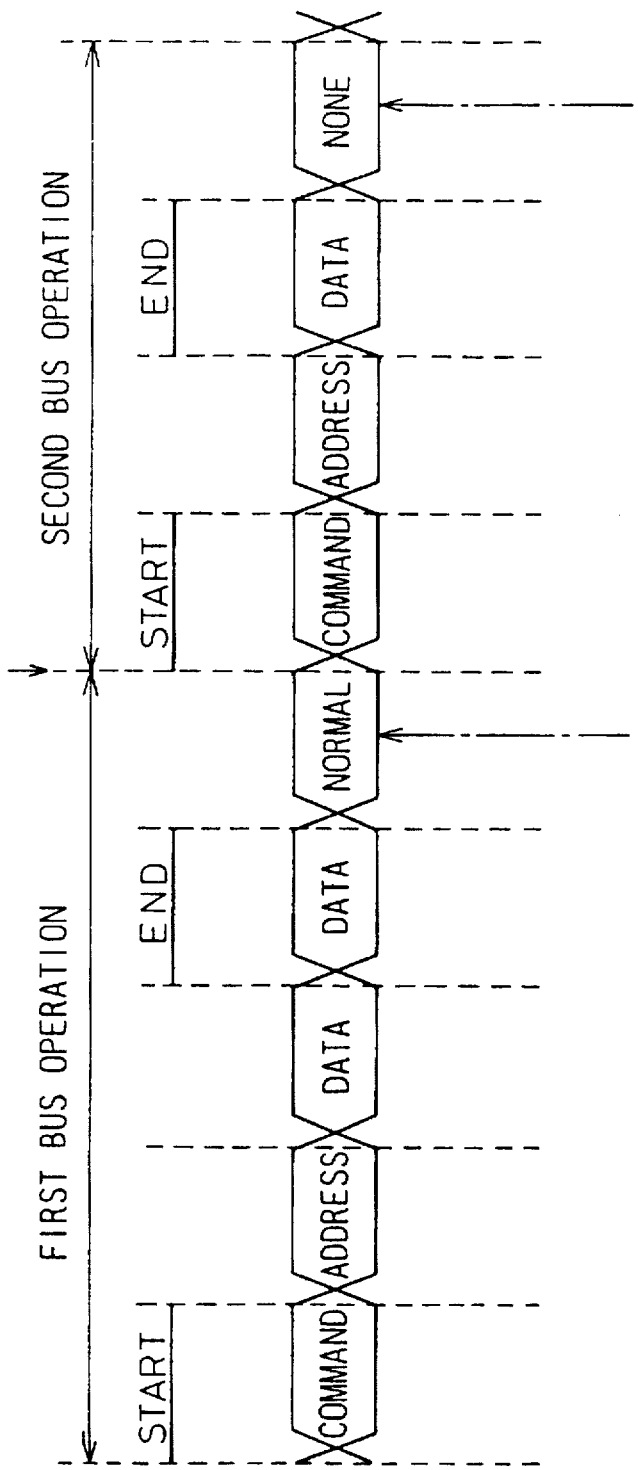
FIG. 10 shows bus operations performed by a certain unit in the multi-processor system shown in FIG. 9, wherein transfer sequences concerning a tag bus, a data bus, and a response bus are illustrated for a bus operation performed on a connected unit (first bus operation) and a bus operation performed on an unconnected unit (second bus operation)

FIG. 10 shows bus operations performed by a certain unit in the multi-processor system in FIG. 9. During the first bus operation, the unit 11B performs a bus operation on the connected unit 11A. During the second bus operation, the unit 11A performs a bus operation on the unconnected unit 11C. In this embodiment, a response bus is not included. A response signal sent from the bus slave 11A during the first bus operation and a response signal sent from the bus arbiter 12 during the second bus operation are transmitted over the data bus.

Figure 11:
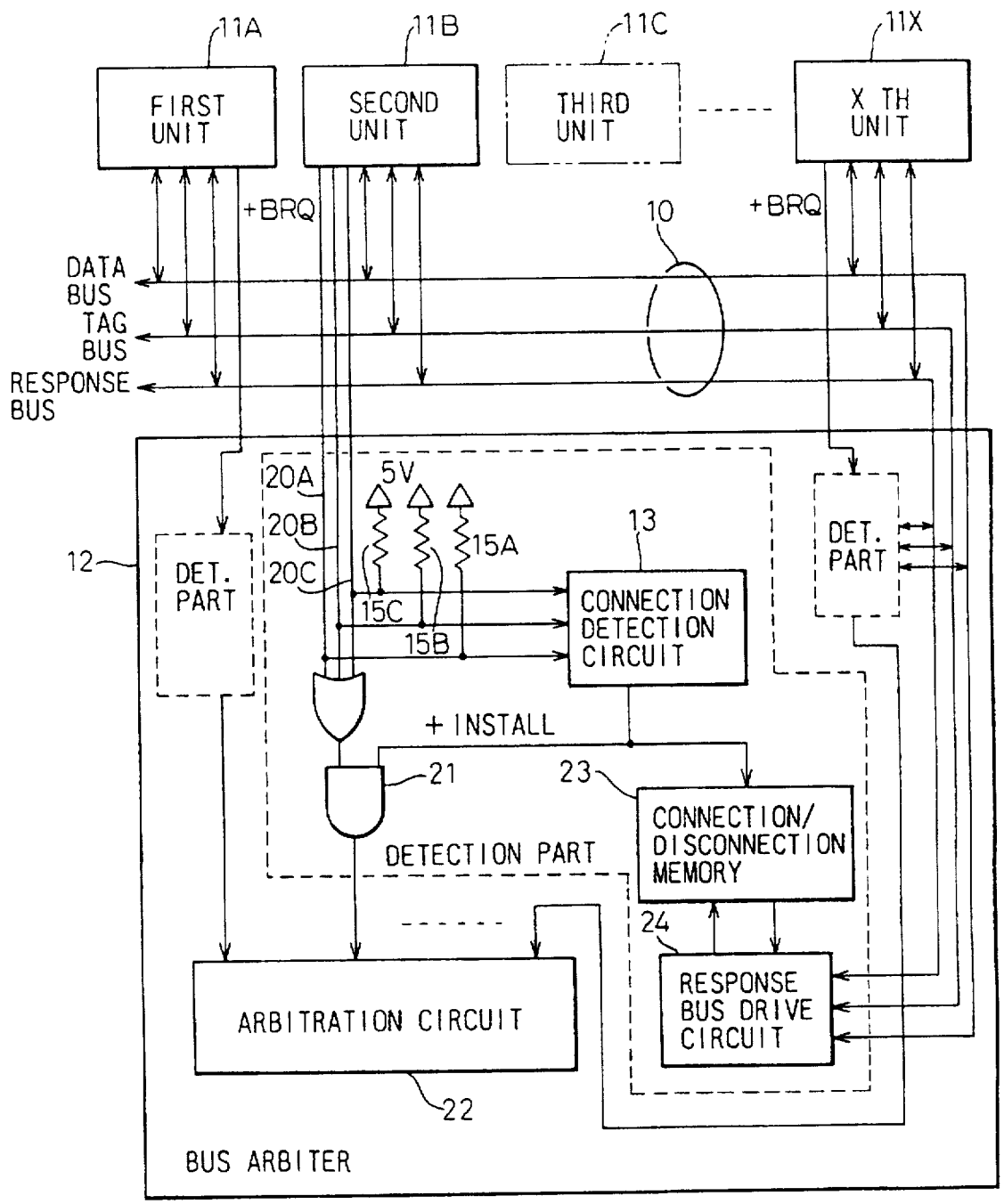
FIG. 11 is a block diagram showing a configuration of a bus arbiter of yet another embodiment of the present invention for a multi-processor system that includes a plurality of specific signal lines.

FIG. 11 shows a configuration of a bus arbiter of yet another embodiment of the present invention for a multi-processor system having a plurality of specific signal lines 20. In this embodiment, the number of specific signal lines 20 is three: specific signal lines 20A to 20C. In this case, the connection detection circuit 13 must be linked with the three specific signal lines 20A to 20C.

As described so far, according to the present invention, a signal line conformable to a specific transmission rule in a normal control mode is monitored to detect a connected or unconnected state of a unit; that is, presence or absence of a unit. This obviates the necessity of laying down dedicated signal lines for use in reporting a connected or unconnected state in one-to-one correspondence with units. Furthermore, since a bus arbiter detects a connected or unconnected state of a unit, the bus arbiter can substitute for an unconnected bus slave unit to drive a response signal on a response bus. This results in improved system reliability.

What is claimed is:

1. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:

unconnected-state setting means that, when a unit is not connected, fixes said one or more signal lines to a state unfeasible in a normal control mode;

monitoring means for monitoring said specific signal line or specific signal lines;

unit connected/unconnected-state detecting means that when said one or more signal lines are controlled under a specific transmission rule, identifies a connected state, and that when said one or more signal lines are fixed to said state unfeasible in a normal control mode, identifies an unconnected state; and storage means for storing the connected/unconnected-state detected by said detecting means during processing by said multi-processor system;

wherein a signal inhibiting means is located to link said one or more signal lines with an arbitrating means incorporated in said bus arbiter;

wherein when said one or more signal lines are fixed to a state unfeasible in a normal control mode, said unit connected/unconnected-state detecting means actuates said signal inhibiting means so that said signal inhibiting means inhibits a signal from being sent to said arbitrating means over said one or more signal lines; and wherein said system bus includes a data bus, a tag bus, and a response bus, and said response bus is used to send a response signal from a unit designated as a bus slave or from said bus arbiter with a certain unit unconnected.

2. A bus arbiter for a multi-processor system as set forth in claim 1, wherein a signal inhibiting means is located to link said specific signal line or specific signal lines with an arbitrating means incorporated in said bus arbiter; and wherein when said specific signal line or specific signal lines are fixed to a state unfeasible in a normal control mode, said unit connected/unconnected-state detecting means actuates said signal inhibiting means so that said signal inhibiting means inhibits a signal from being sent to said arbitrating means over said specific signal line or specific signal lines.

3. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:

unconnected-state setting means that, when a unit is not connected, fixes said one or more signal lines to a state unfeasible in a normal control mode;

monitoring means for monitoring said one or more signal lines;

unit connected/unconnected-state detecting means that when said one or more lines are controlled under a specific transmission rule, identifies a connected state, and that when said one or more signal lines are fixed to said state unfeasible in a normal control mode, identifies an unconnected state; and storage means for storing the connected/unconnected-state detected by said detecting means during processing by said multi-processor system; and wherein said system bus includes a tag bus and a data bus, and said data bus is used to send a response signal from a certain unit designated as a bus slave or from said bus arbiter with a certain unit unconnected.

4. A bus arbiter for a multi-processor system as set forth in claim 3, wherein a signal inhibiting means is located to link said specific signal line or specific signal lines with an arbitrating means incorporated in said bus arbiter; and wherein when said specific signal line or specific signal lines are fixed to a state unfeasible in a normal control mode, said unit connected/unconnected-state detecting means actuates said signal inhibiting means so that said signal inhibiting means inhibits a signal from being sent to said arbitrating means over said specific signal line or specific signal lines.

5. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:

unconnected-state setting means that, when a unit is not connected, fixes said one or more signal lines to a state unfeasible in a normal control mode;

monitoring means for monitoring said one or more signal lines;

unit connected/unconnected-state detecting means that when said one or more signal lines are controlled under a specific transmission rule, identifies a connected state, and that when said one or more signal lines are fixed to said state unfeasible in a normal control mode, identifies an unconnected state; and storage means for storing the connected/unconnected-state detected by said detecting means during processing by said multi-processor system; and wherein said state unfeasible in a normal control mode is a state in which said one or more signal lines are linked with a power supply via a pull-up resistor in said bus arbiter.

6. A bus arbiter for a multi-processor system as set forth in claim 5, wherein a signal inhibiting means is located to link said specific signal line or specific signal lines with an arbitrating means incorporated in said bus arbiter; and wherein when said specific signal line or specific signal lines are fixed to a state unfeasible in a normal control mode, said unit connected/unconnected-state detecting means actuates said signal inhibiting means so that said signal inhibiting means inhibits a signal from being sent to said arbitrating means over said specific signal line or specific signal lines.

7. A bus arbiter for a multi-processor system including processing units using a system bus, comprising:
 a bus arbitration circuit arbitrating between access requests by the processing units for the system bus;
 bus arbitration request lines respectively connectable to the processing units;
 connection detection circuits connected to said arbitration circuit and said lines and detecting whether the processing units are connected;
 connection storage connected to said detection circuits and storing states indicating whether the processing units are connected; and
 an arbitration response circuit connected to said connection storage, said arbitration circuit and the processing units via a response bus and responding on the basis of the request and the detections of connection.

8. A bus arbiter for a multi-processor including processing units accessing a system bus, comprising:
 arbitration request signal lines respectively connectable to the processing units;
 connection detection circuits connected to said lines and detecting whether the respective processing units are connected;
 a memory connected to said connection detection circuits and storing a connection/disconnection state responsive to the detecting; and
 arbitration means arbitrating between the processing units responsive to arbitration requests and whether the processing units are connected.

9. A bus arbiter for a multi-processor system including processing units using a system bus having bus signal lines, comprising:
 connection detection circuits connected to the lines, monitoring and detecting whether the processing units are connected to the lines;
 a connection/disconnection memory storing results of the detecting as a connection state; and
 a bus arbitration system arbitrating between access requests by the processing units for the system bus on the basis of the requests and the detections of connection.

10. A bus arbiter for a multi-processor system including processing units using a system bus having bus signal lines, comprising:
 connection detection circuits connected to the lines and detecting whether the processing units are connected to the lines;
 a memory connected to said connection detection circuits and storing a connection/disconnection state responsive to the detecting;
 a response bus drive circuit connected to said memory and responding with the state when a processing command is issued; and
 a bus arbitration system arbitrating between access requests by the processing units for the system bus on the basis of the requests and the detections of connection.

11. A bus response system for a multi-processor system including processing units using a system bus having bus signal lines, comprising:
 connection detection circuits connected to the lines, monitoring and detecting whether the processing units are connected to the lines;
 a memory connected to said connection detection circuits and storing a connection/disconnection state responsive to the detecting; and
 a response bus drive circuit connected to said memory and responding with the state when a processing command is issued.

12. A bus arbiter for a multi-processor system including processing units using a system bus, comprising:
 a bus arbitration circuit arbitrating between access requests by the processing units for the system bus;
 bus arbitration request lines respectively connectable to the processing units;
 connection detection circuits connected to said arbitration circuit and said lines and detecting whether the processing units are connected;
 connection storage connected to said detection circuits storing a connection/disconnection state responsive to the detecting;
 a response bus drive circuit connected to said memory and responding with the state when a processing command is issued; and
 an arbitration response circuit connected to said connection storage, said arbitration circuit and the processing units via a response bus and responding on the basis of the request and the detections of connection.

13. A bus arbiter for a multi-processor including processing units accessing a system bus, comprising:
 arbitration request signal lines respectively connectable to the processing units;
 connection detection circuits connected to said lines and detecting whether the respective processing units are connected;
 a memory connected to said connection detection circuits and storing a connection/disconnection state responsive to the detecting;
 a response bus drive circuit connected to said memory and responding with the state when a processing command is issued; and
 arbitration means arbitrating between the processing units responsive to arbitration requests and whether the processing units are connected.

14. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:
 unconnected-state setting means that, when a unit is not connected, fixes said one or more signal lines to a state unfeasible in a normal control mode;
 monitoring means for monitoring said specific signal line or specific signal lines;
 unit connected/unconnected-state detecting means that when said one or more signal lines are controlled under a specific transmission rule, identifies a connected state, and that when said one or more signal lines are fixed to said state unfeasible in a normal control mode, identifies an unconnected state;

storage means for storing the connected/unconnected-state detected by said unit connected/unconnected-state detecting means during processing by said multi-processor system; and a response bus drive means for responding with the state when a processing command is issued;

wherein a signal inhibiting means is located to link said one or more signal lines with an arbitrating means incorporated in said bus arbiter;

wherein when said one or more signal lines are fixed to a state unfeasible in a normal control mode, said unit connected/unconnected-state detecting means actuates said signal inhibiting means so that said signal inhibiting means inhibits a signal from being sent to said arbitrating means over said one or more signal lines; and wherein said system bus includes a data bus, a tag bus, and a response bus, and said response bus is used to send the state as a response signal from a unit designated as a bus slave or from said bus arbiter with a certain unit unconnected.

15. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:

unconnected-state setting means that, when a unit is not connected, fixes said one or more signal lines to a state unfeasible in a normal control mode;

monitoring means for monitoring said one or more signal lines;

unit connected/unconnected-state detecting means that when said one or more lines are controlled under a specific transmission rule, identifies a connected state, and that when said one or more signal lines are fixed to said state unfeasible in a normal control mode, identifies an unconnected state;

storage means for storing the connected/unconnected-state detected by said unit connected/unconnected-state detecting means during processing by said multi-processor system; and a response bus drive means for responding with the state when a processing command is issued; and wherein said system bus includes a tag bus and a data bus, and said data bus is used to send the state as a response signal from a certain unit designated as a bus slave or from said bus arbiter with a certain unit unconnected.

16. A bus arbiter for a multi-processor system in which a plurality of units can be connected over a single system bus, and one or more signal lines are laid to link said units with said bus arbiter respectively and conform only to a specific transmission rule in a normal control mode, said bus arbiter comprising:

unconnected-state setting means that, when a unit is not connected, fixes said one or more signal lines to a state unfeasible in a normal control mode;

monitoring means for monitoring said one or more signal lines;

unit connected/unconnected-state detecting means that, when said one or more signal lines are controlled under a specific transmission rule, identifies a connected state, and that when said one or more signal lines are fixed to said state unfeasible in a normal control mode, identifies an unconnected state;

storage means for storing the connected/unconnected-state detected by said unit connected/unconnected-state detecting means during processing by said multi-processor system;

a response bus drive means for responding with the state when a processing command is issued; and wherein said state unfeasible in a normal control mode is a state in which said one or more signal lines are linked with a power supply via a pull-up resistor in said bus arbiter.

* * * * *